United States Patent [19]
Karol et al.

[11] Patent Number: 5,773,523
[45] Date of Patent: Jun. 30, 1998

[54] 1,3,4-THIDIAZOLE ETHER CURING SYSTEMS FOR CHLORINE CONTAINING POLYMERS

[75] Inventors: Thomas J. Karol, Norwalk; Ronald J. Tepper, Fairfield; Lester A. Dow, Newtown, all of Conn.

[73] Assignee: R.T. Vanderbilt Company, Inc., Norwalk, Conn.

[21] Appl. No.: 574,567

[22] Filed: Dec. 14, 1995

[51] Int. Cl.$^6$ .............................. C08K 5/46; C08K 5/47; C08F 8/30; C08F 8/34
[52] U.S. Cl. ..................... 525/330.4; 525/330.5; 525/330.9; 525/331.1; 525/332.6; 525/333.9
[58] Field of Search .............. 525/331.1, 330.9, 525/330.4, 333.9, 330.5, 332.6

[56] References Cited

U.S. PATENT DOCUMENTS

| | | | |
|---|---|---|---|
| 4,128,510 | 12/1978 | Richwine | 528/36 |
| 4,895,794 | 1/1990 | Ogawa | 430/567 |
| 4,978,703 | 12/1990 | Ainsworth et al. | 524/298 |
| 4,978,716 | 12/1990 | Flynn et al. | 525/195 |
| 5,194,621 | 3/1993 | Karol et al. | 548/142 |
| 5,391,621 | 2/1995 | Ohm et al. | 525/160 |

*Primary Examiner*—Mark L. Warzel
*Attorney, Agent, or Firm*—Rasma B. Balodis

[57] ABSTRACT

The present invention provides an improved curing system for chlorinated polymers using as a curing agent alkyl ether and alkyl thioether derivatives of 2,5-dimercapto)-i,3,4-thiadiazole and of its climer.

10 Claims, No Drawings

1,3,4-THIDIAZOLE ETHER CURING SYSTEMS FOR CHLORINE CONTAINING POLYMERS

BACKGROUND OF THE INVENTION

The present invention relates to curing systems based on ether derivatives of 2,5-dimercapto-1,3,4-thiadiazole compounds and their use in curing chlorine-containiny polymers.

In the past, chlorine-containing polymers have been compounded with curatives and other ingredients for vulcanization into vulcanizates for use in various industrial and consumer applications. Many known curing arrelerators, however, are highly active at relatively low temperatures ancI consequently may cause premature vulcanization or scorching. This phenomenon may lead to unsatisfactory physical properties of the vulcanizate.

Another problem of known 1,3,4-tihiadliazole curing agents is poor bin storage stability. That is, the viscosity tends to increase during storage of the chlorinated polymer compounded with the thiadiazole based curative. The increased viscosity requires tedious process control, as for example frequent adjustment of machine settings.

Known accelerators based on 2,5-dimercapto-1,3,4-thiadiazole compounds are disclosed in U.S. Pat. No. 4,128,510 and U.S. Pat. No. 5,391,621.

Surprisingly, it has been discovered that certain ether derivatives of 2,5-dimercapto-1,3,4-thiadiazole are effective curing agents for chlorinated polymers. These ether derivatives provide a long scorch time as well as rapid ciossli-inkiiig once the onset of cure is reached. Another unexpected benefit for the subject ether derivatives is improved bin storage stability. Thus mixed stock can be used for extended periods of time witfhoini affecting process conditions.

SUMMARY OF THE INVENTION

In accordance with the invention, there is provided an improved curing system for chlorinated polymer compositions.

The curable compositions comprise a mixture of saturated and unsaturated chlorine containing polymers and an ether derivative of 2,5-dimercapto-1,3,4-thiadiazole having the formulae I and II

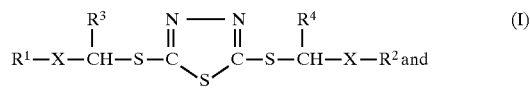
(I)

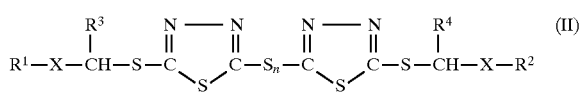
(II)

wherein n=1–2, X represents O or S and $R^1$ and $R^2$ are selected independently from linear or branched chain alkyl groups having 1 to 8 carbon atoms, and $R^3$ and $R^4$ represent hydrogen or $R^1$ and $R^2$ groups.

DETAILED DESCRIPTION OF THE INVENTION

The 2,5-dimercapto-1,3,4-thiadiazole useful as curing agents or curing accelerators in accordance with the invention are ether or thioether derivatives. The compounds are derived either from one molecule of 2,5-dimercapto-1,3,4-thiadiazole or its dimer and have the structural formulae

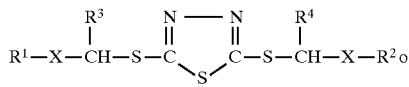

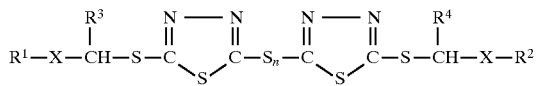

wherein n=1–2, X represents O or S. The $R^1$, $R^2$, $R^3$ and $R^4$ groups are the same or different alkyl groups having 1 to 8 carbon atoms and $R^3$ and $R^4$ can be hydrogen. Examples of suitable groups include linear or branched alkyl radicals such as methyl, ethyl, propyl, butyl, isobutyl, hexyl, 2-ethylhexyl, octyl and the like.

The compounds are not novel per se. The ether compounds within the scope of the above formulae are described in U.S. Pat. No. 5,194,621 and are useful antiwear agents and antioxidants for lubricants. The ether derivatives are disclosed as useful for photographic applications in U.S. Pat. No. 4,895,794.

Any saturated or unsaturated chlorine containing polymer containing at least one percent aind preferably about five percent by weight of chlorine may he crosslinked in accordance with the invention. The chlorine content may range tip to 40 percent based on the weight of the polymer. Typical of the chlorine containing polymers are, among others, homopolymers of epichilorohydrin, copolymers of epichlorogydrin and ethylene oxide or propylene oxide, polychloroprene, chlorinated polyolefins, chlorosulfonated polyolefin, polychloroalkylacrylates and chlorobutyl rubber. The polymers are well known and available commercially.

The chlorine containing polymers may be blended with non-halogen containing polymers provided there is a sufficient chlorine content present to effect crosslinking. The blends can include natural rubber, polybutadiene, polyolefins, copolymers of butadiene with styrene (SBR) or acrylonitrile (NBR), copolymers of ethylene-propylene-diene (EPDM), butyl rubber and the like. Such blends may contain from about 10 to about 90% by weight of each type of polymer, more preferably from about 25 to 75% by weight, based on the polymer content of the blend. The most preferred blends are those containing the chlorinated polymer at levels of from about 25 to 75% by weight.

The ether and thioether derivatives of this invention may be incorporated into the polymer composition in their pure form or they may be mixed with one or more liquid diluents. They may also be adsorbed onto the surface of finely divided, inert carrier to provide a powdered product.

Suitable diluents, among others, include aromatic, naphthenic and paraffinic hydrocarbon oil; polyglycols and glycols; alkyl esters of dibasic acids, e.g. dioctyl phthalate, dioctyl sebacate, dioctyl adipate, diisodecyl glutarate, dioctyl azolate; alkyl sulfides; fatty acid esters, e.g., butyl oleate, butyl stearate, octyl epoxy tallate, trioctyl trimellitate; polyester plasticizers, e.g. polymeric di(butoxy-ethoxy-ethyl) adipate, polymer of bis(ethylerieoxy)methane with disulfide linkages; petroleum suIfonates; alkyl trimellitates; and polymeric esters.

Suitable finely divided carrier materials include carbon black, metal oxides, such as aluminum oxide; alumina; silica; mineral fillers such as clay, talc and betonite; aluminosilicates; zeolites, calcium silicate and similar carriers.

The amount of the ether or thioether active ingredient effective to cure the chlorinated polymer composition will vary as a function of the chlorine content of the elastomer. Generally, it is employed in the range from about 0.1 to about 10.0 parts by weight per 100 parts by weight of chlorinated polymer present in the curable composition, more preferably in the range of about 0.5 to about 5.0 parts by weight per 100 parts by weight of chlorinated elastomer. Where the ether derivatives are diluted or combined with a finely divided carrier, higher levels of the resulting material may be used to provide the required level of active ingredient.

In case of polymers having relatively unreactive chlorine substituent, it is preferable to use a secondary accelerator of the aliphatic or aromatic amine type. Suitable accelerators, among others, include the reaction product of butyraldehyde and aniline, available commercially under the trade name VANAX® 808 from R.T. Vanderbilt Company, Inc., fatty amines, and quaternary ammonium salts, such as tetrabutylammonium bromide and tetraethylammonium chloride.

For curing blends of chlorinated and non-chlorinated polymers, sulfur or other well known sulfur-containing curatives for unsaturated elastomers may be included in the composition.

Examples of such compounds are sulfur, benzothiazyl disulfide, N-oxydiethylene benzotliiazole-2-sulfenamide, 2-mercaptobenzo-thiazole, alkyl phenol disulfides, tetraalkylthiutam disulfide having normal or branched chain alkyl groups, m-phenylene-bismaleimide, N,N'-diarylguanidines, and like known materials.

Other additives that may be desirable for crosslinking with the ether and thioether derivatives include basic metal oxides, metal hydroxides and metal salts of carboxylic acids. Typical additives include zinc oxide, magnesium oxide, zinc stearate and sodium acetate. The magnesium oxide may be synthetic or a natural magnesite mineral. The magnesite may be calcined or treated by other similar processes to yield a predominantly magnesium oxide product.

In addition to the curatives, the polymer composition may include antioxidants as for example octylated diphenylamine, diphenyl-p-phenylenediamine and styrenated phenol type antioxidants.

The vulcanizable composition may be prepared and blended using any suitable mixing device such as a two-roll mill, an internal mixer (Brabender Plasticorder), a Banbury Mixer, a kneader or a similar mixing device. The processing and vulcanization techniques are well known in the art.

The following examples are given to further illustrate the invention. All percentages and parts are based on weight unless otherwise indicated.

EXAMPLE 1

Vulcanizate compositions were prepared by compunding neoprene W with compounding ingredients and the 2,5-dimercapto-1,3,4-thiadiazole (DMTD) curing agents of the invention as indicated in Table I. The dimer described therein is 2,2'-di(butoxymethyl)-5,5'-dithiobis (1,3,4-thiadiazole).

The vulcanizates were press cured at 160° C. for 20 minutes. The physical properties of the vulcanizates were evaluated by the following test methods: Torque and scorch time by ASTM D2084, Mooney parameters by ASTM D1646 using a rotor, physical properties by ASTM D412 and D2250 and compression set by ASTM 0395, Method B.

The results compiled in Table I demonstrate the improved storage characteristics of vulcanizates cured with the curative of the invention. The improved curatives showed a long delay before the onset of the cule as indicated by the scorch times and they attained full cure in 2 to 4 minutes once crosslinking began. See the results of times to 90 minus ts 2. The rheometer cure tests further indicate the desirable curing characteristics of the components of the invention.

The above embodiments have shown various aspects of the present invention. Other variations will be evident to those skilled in the art and such modifications are intended to be within the scope of the invention as defined by the appended claims.

TABLE I

| Ingredients | Vulcanizates, parts by weight | | | |
|---|---|---|---|---|
|  | 1 | 2 | 3 | 4 |
| Neoprene W | 100.0 | 100.0 | 100.0 | 100.0 |
| Stearic acid | 0.5 | 0.5 | 0.5 | 0.5 |
| Magnesium oxide | 4.0 | 4.0 | 4.0 | 4.0 |
| Plasticizer[1] | 5.0 | 5.0 | 5.0 | 5.0 |
| Octylated diphenylamine | 2.0 | 2.0 | 2.0 | 2.0 |
| Carbon black | 75.0 | 75.0 | 75.0 | 75.0 |
| Zinc oxide | 5.0 | 5.0 | 5.0 | 5.0 |
| 2,5-Di(butoxymethyl)DMTD | 1.5 | — | — | — |
| 2,5-Di(1-methoxypropyl)DMTD | — | 1.5 | — | — |
| 2,5-Di(octylthiomethyl)DMTD | — | — | 1.5 | — |
| 2,2'-Di(butoxymethyl)5,5'-dithio DMTD dimer | — | — | — | 1.5 |
| Physical Properties | | | | |
| Press cured at 160° C., minutes | 20 | 15 | 10 | 20 |
| 200% Modules, psi | 1047 | 1050 | 439 | 931 |
| Tensile strength, psi | 2414 | 1875 | 1935 | 2056 |
| Elongation, percent | 413 | 420 | 816 | 447 |
| Hardness, Shore A | 63.5 | 64 | 57 | 64 |
| Rheometer at 160° C., 100 CPM, 3° Arc, 20 sec. | | | | |
| Minimum torque, in.-lb. | 8.5 | 10 | 8.5 | 9.0 |
| Maximum torque, in.-lb. at 30 min. | 81 | 93.5 | 50.0 | 81.0 |
| Scorch time (ts2) min. | 3.7 | 1.1 | 3.7 | 2.6 |
| Cure time (tc90) min. | 7.6 | 3.4 | 7.7 | 7.0 |
| Cure rate Index, tc90–ts2 | 3.9 | 2.3 | 4.0 | 4.4 |
| Compression set after 22 hours at 100° C. | 10.5 | 17.5 | 15 | 15 |
| Set, percent Mooney at 121° C. | | | | |
| Scorch, t5, minutes | 22.4 | 7.0 | 30.4 | 17.5 |
| Viscosity, ML | 27 | 55.5 | 30.0 | 27.5 |
| Bin stability after storage at 38° C., Mooney at 121° C. after weeks | 2 | 2 | 2 | 2 |
| Viscosity, ML | 31.5 | 51 | 31 | 33 |
| Change in viscosity, points | +4.5 | −4.5 | +1 | +5.5 |

[1]VANPLAST ® PL, sodium petroleum sulfonate distributed by R. T. Vanderbilt Company, Inc.

We claim:

1. A curable composition comprising a major amount of chlorinated polymer selected from the group consisting of poly-chloroprene, chlorinated polyolefins, chlorosulfonated polyolefins, epichlorohydrin, copolymers of epichlorohydrin and ethylenle oxide or propylene oxide and mixtures thereof, and an ether derivative of 2,5-dimercapto-1,3,4-thiadiazole having the formulae I and II

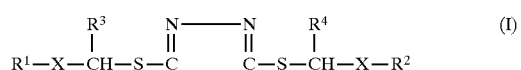

and

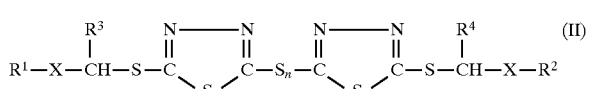

wherein n=1–2, X represents O or S, $R^1$ and $R^2$ represent linear or branched chain alkyl groups having 1 to 8 carbon atoms and $R^3$ and $R^4$ represent hydrogen or alkyl groups having 1 to 8 carbon atoms and wherein the ether derivative is present in an amount effective to cure said chlorinated polymer.

2. A composition of claim 1 wherein said ether derivative is present at a level ranging from about 0.1 to 10 parts by weight per hundred parts by weight of said chlorinated polymer.

3. A composition of claim 1 wherein $R^1$ and $R^2$ alkyl groups contain 1 to 4 carbon atoms and X is oxygen.

4. A composition of claim 1 wherein $R^1$ and $R^2$ alkyl groups contain 8 carbon atoms and X is sulfur.

5. A composition of claim 1 which further contains magnesium oxide in an amount effective to co-cure said composition.

6. A composition of claim 1 wherein the ether derivative is mixed with a diluent or carrier.

7. A composition according to claim 1 wherein the ether derivative is 2,5-dibutoxymethyl-1,3,4-thiadiazole.

8. A composition according to claim 1 wherein the ether derivative is 2,2'-di(butoxymethyl)-5,5'-dithiobis (1,3,4-thiadiazole).

9. A method for preparing a vulcanized composition of a chlorinated polymer selected from the group consisting of polychloroprene, chlorinated polyolefins, chlorosulfotiated polyolefins, polychloroacrylates, chlorinated butyl rubber, homopolymers of epichlorohydrin, copolymers of epichlorohydrin and ethylene oxide or propylene oxide and mixtures thereof, comprising the steps of (a) premixing said chlorinated polymer with an ether derivative of 2,5-dimercapto-1,3,4-thiadiazole having the formulae I and II

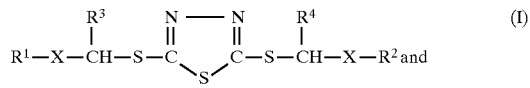

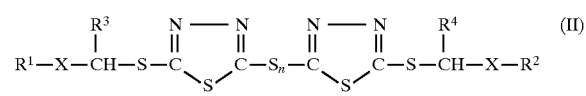

wherein n=1–2, X represents O or S, $R^1$ and $R^2$ represent linear or branched chain alkyl groups having 1 to 8 carbon atoms, and $R^3$ and $R^4$ represent hydrogen or alkyl groups having 1 to 8 carbon atoms in an amount ranging from about 0.1 to 10 parts by weight per hundred parts by weight of said chlorinated polymers, (b) adding other compounding ingredients and (c) curing at a curing temperature and for a period of time sufficient to cure said composition.

10. A method for preparing a vulcanized composition of a chlorinated polymer according to claim 9 wherein the compounding ingredients further comprise magnesium oxide.

* * * * *

UNITED STATES PATENT AND TRADEMARK OFFICE
CERTIFICATE OF CORRECTION

ATENT NO. : 5,773,523

ATED : June 30, 1998

JVENTOR(S) : Thomas A. Karol, Ronald J. Tepper, and Lester A. Doe

It is certified that errors appear in the above-identified patent and that said Letters atent is hereby corrected as shown below:

Title page, item [54], "1,3,4-THIDIAZOLE," should read --1,3,4-THIADIAZOLE--;

Title page, item [75], "Lester A. Dow" should be --Lester A. Doe--;

Title page, item [57], the phrase "2,5-dimercapto)-i,3,4-thiadiazole and of its climer" should read 2,5-dimercapto-1,3,4-thiadiazole and of its dimer--;

Col. 1, line 1, the title of the invention, "1,3,4-THIDIAZOLE," should read --1,3,4-HIADIAZOLE--;

Col. 1, line 19, "1,3,4-tihiadliazole" should read --1,3,4-thiadiazole--;

Col. 2, line 25, "tip" should read --up--;

Col. 2, line 28, "epichilorohydrin" should read --epichlorohydrin--;

Col. 2, lines 28-29, "epichlorogydrin" should read --epichlorohydrin--;

Col. 2, line 57, "bis(ethylerieoxy)methane" should read --bis(ethyleneoxy)methane--;

Col. 2, line 62, "betonite" should read --bentonite--;

Col. 3, line 21, "benzotliiazole-2-sulfenamide" should read --benzothiazole-2-sulfenamide--;

Col. 3, lines 22-23, "tetraalkylthiutam" should read --tetraalkylthiuram--;

Col. 3, line 48, "compunding" should read --compounding--;

Col. 3, line 63, "cule" should read --cure--;

UNITED STATES PATENT AND TRADEMARK OFFICE
CERTIFICATE OF CORRECTION

PATENT NO. : 5,773,523
DATED : June 30, 1998
INVENTOR(S) : Thomas A. Karol, Ronald J. Tepper, and Lester A. Doe It is certified that error appears in the above-identified patent and that said Letters Patent is hereby corrected as shown below:

Col. 4, line 51, "polyolefins, epichlorohydrin" should read --polyolefins, polychloroacrylates, chlorinated butyl rubber, homopolymers of epichlorohydrin--; and Col. 5, line 24, "chlorosulfotiated" should read --chlorosulfonated--.

Signed and Sealed this

Twelfth Day of January, 1999

Attest:

*Attesting Officer*    *Acting Commissioner of Patents and Trademarks*